United States Patent [19]

Odajima et al.

[11] Patent Number: 4,898,200

[45] Date of Patent: Feb. 6, 1990

[54] ELECTROPNEUMATIC TRANSDUCER

[75] Inventors: Katsuhiko Odajima; Motoshige Ikehata, both of Sohka, Japan

[73] Assignee: Shoketsu Kinzohu Kogyo Kabushiki Kaisha, Tokyo, Japan

[21] Appl. No.: 341,269

[22] Filed: Apr. 21, 1989

Related U.S. Application Data

[63] Continuation of Ser. No. 729,188, May 1, 1985, abandoned.

[30] Foreign Application Priority Data

May 1, 1984 [JP] Japan .................................. 59-88178
Feb. 8, 1985 [JP] Japan .................................. 60-23094

[51] Int. Cl.[4] .............................................. G05D 16/20

[52] U.S. Cl. .................................... 137/85; 137/116.5; 137/487.5; 137/627.5

[58] Field of Search ..................... 137/85, 116.5, 487.5, 137/627.5

[56] References Cited

U.S. PATENT DOCUMENTS 2,964,051 12/1960 Garnett .................................. 137/85
2,984,251 5/1961 Quinby .......................... 137/487.5 X
2,993,497 7/1961 Coles ...................................... 137/85
2,994,334 8/1961 Loveless ........................ 137/116.5 X
3,063,422 11/1962 Gregowski ......................... 137/82 X
3,313,212 4/1967 Baker ................................ 137/85 X

FOREIGN PATENT DOCUMENTS 125951 4/1959 U.S.S.R. ................................. 137/85

*Primary Examiner*—Robert G. Nilson
*Attorney, Agent, or Firm*—Birch, Stewart, Kolasch & Birch

[57] ABSTRACT

An electropneumatic transducer for converting an electric signal to a pneumatic pressure has a nozzle flapper mechanism and a pilot valve engaging a diaphragm assembly. The nozzle flapper mechanism has a nozzle flapper composed of an electrostrictive element. The diaphragm assembly comprises two diaphragms having different effective areas. A nozzle back pressure is applied to one of the diaphragms, and an atmospheric pressure is applied to the other diaphragm. A supplied pressure or output pressure is applied between the two diaphragms. The nozzle back pressure is varied dependent on the voltage applied to the electrostrictive element for moving the diaphragms to enable the pilot valve to control a valve disposed in a passage connecting supply and output ports.

3 Claims, 8 Drawing Sheets

ELECTROPNEUMATIC TRANSDUCER

This application is a continuation of application Ser. No. 729,188 filed on May 1, 1985, now abandoned.

BACKGROUND OF THE INVENTION

The present invention relates to an electro-pneumatic transducer for converting an electric signal to a fluid pressure, especially, .a pneumatic pressure, and more particularly to an electropneumatic transducer including as a transduction element a nozzle flapper comprising an electrostrictive element, and incorporating a pilot valve for increasing an output gain.

Heretofore, torque motors have widely been used as electropneumatic transducers for converting electric signals to pneumatic pressures. The torque motor has a coil supplied with a current to produce a rotative force commensurate with the supplied current, the rotative force being converted as a nozzle flapper, a pilot valve, etc. to a pneumatic pressure. Normally, the current supplied to the torque motor is a direct current ranging from 4 mA to 20 mA.

Where a control device such as an electro-pneumatic transducer employing the torque motor, the control device is more resistant to mechanical vibrations and other disturbances and stabler in performance if the motor generates a greater torque.

In view of recent demands for smaller and lighter control devices, it has become an important task to make torque motors smaller in size. In general, however, the smaller the torque motor, the smaller the torque produced dependent on the supplied current, and hence the less resistant to mechanical vibrations. Under some conditions in which the control device is intended to be used, it would be technically impossible to employ the torque motor.

The inventor has made efforts to reduce the size and weight of a torque motor while making it more resistant to vibrations and impacts. As a result, the inventor has found electrostrictive elements to be of much interest as a transduction element for converting an electric signal to a pneumatic pressure. Although there are different shapes and materials available for electrostrictive elements, the general arrangement is known as the bimorph-type electrostrictive element in the form of a thin rectangular plate disposed as a cantilever with one end fixed and the other end free. When a voltage is applied between the electrodes, the free end of the bimorph-type electrostrictive element is slightly displaced. By constructing a nozzle flapper of an electrostrictive element itself, therefore, a voltage change can easily be converted into a nozzle back pressure. One known nozzle flapper employing an electrostrictive element is disclosed in PCT/SE80/00057 as "A signal converting unit intended to be incorporated in a pneumatic control system". With the above arrangement, the torque motor conventionally used as the transduction element can be replaced with the electrostrictive element. In case the electrostrictive element is sized as 10 mm×20 mm, for example, and has a thickness of about 0.6 mm, the nozzle flapper has a mass that is negligibly small as compared with the torque motor, and is highly resistant to vibrations and impacts.

While the nozzle flapper constructed of the electrostrictive element is of an improved vibration and impact resistance capability, some problems still remain to be solved if it is to be combined with a pilot valve to make an electropneumatic transducer as a final product.

More specifically, since the electrostrictive element is generally displaceable only slightly in response to a change in the voltage applied thereto, the applied voltage should be increased and the required electric circuit should be complicated if a relatively large displacement is to be produced by the electrostrictive element. If the electrostrictive element were displaced to a large degree, then it would be less durable in use.

SUMMARY OF THE INVENTION

In view of the aforesaid difficulties of the conventional electropneumatic transducers, it is an object of the present invention to provide an electropneumatic transducer composed of an electrostrictive element combined with a nonbleed-type pilot valve which consumes a small amount of air even when used under high pressure, the electrostrictive element being of increased resistance to vibrations and impacts and the electropneumatic transducer being small in size and light weight.

The above object of the present invention can be achieved by an electropneumatic transducer comprising a body having supply and output ports, a nozzle flapper mechanism disposed in the body for varying a nozzle back pressure in response to the displacement of a nozzle flapper thereof, an inner valve disposed in a passage connecting the supply port and the output port for opening and closing the passage under the action of a diaphragm assembly operative in response to the nozzle back pressure, the nozzle flapper comprising an electrostrictive element displaceable dependent on a change in an electric signal applied thereto, the diaphragm assembly comprising two flexible diaphragms centrally coupled together by a joining member held in engagement with the inner valve, the nozzle flapper mechanism including a nozzle having a communication hole opening toward one of the diaphragms, the other diaphragm facing into an atmospheric-pressure chamber defined in the body and vented to atmosphere.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
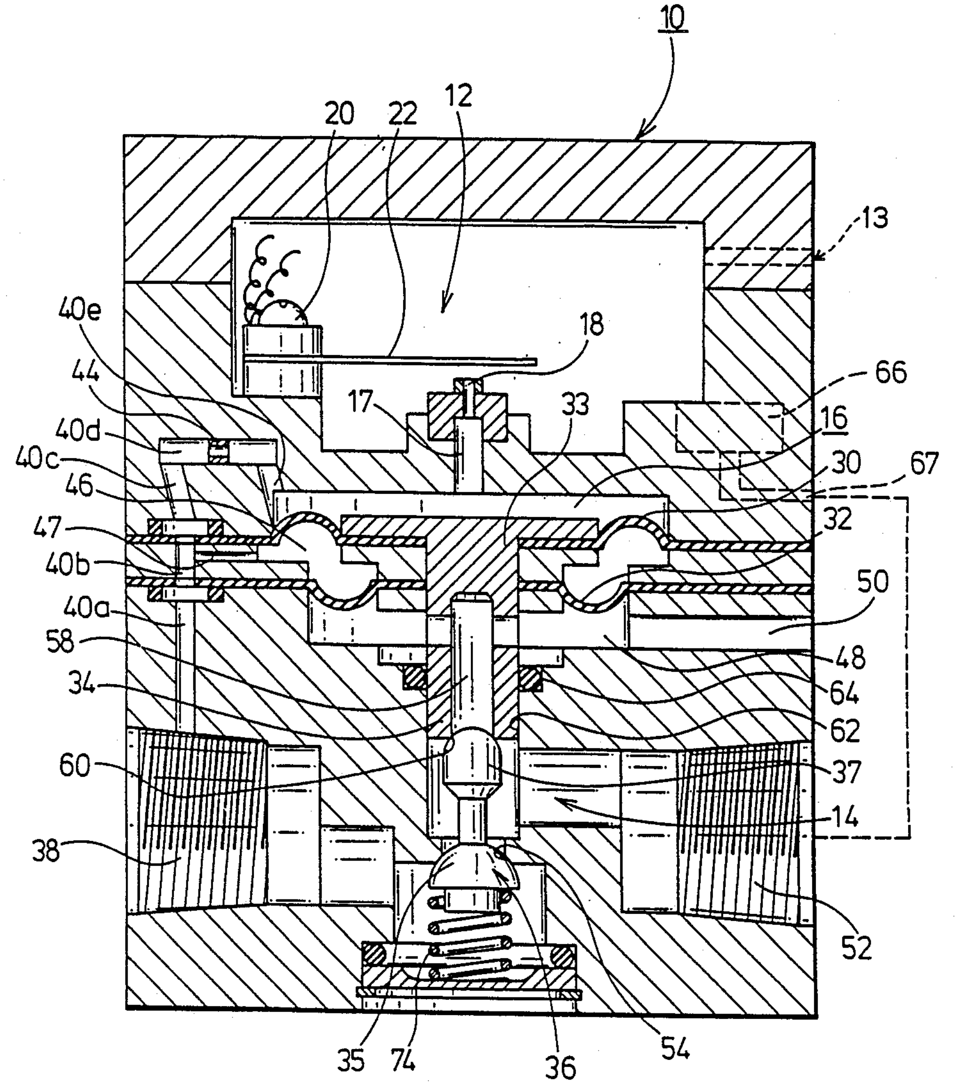
FIG. 1 is a vertical cross-sectional view of an electropneumatic transducer incorporating an electrostrictive element and a pilot valve according to the present invention.

Identical or corresponding parts are denoted by identical or corresponding reference characters throughout several views.

As shown in FIG. 1, an electropneumatic transducer according to the present invention has a unit body or housing 10 accommodating a nozzle flapper mechanism 12 disposed in an upper portion thereof and a pilot valve assembly 14 disposed in a lower portion thereof.

Figure 2:
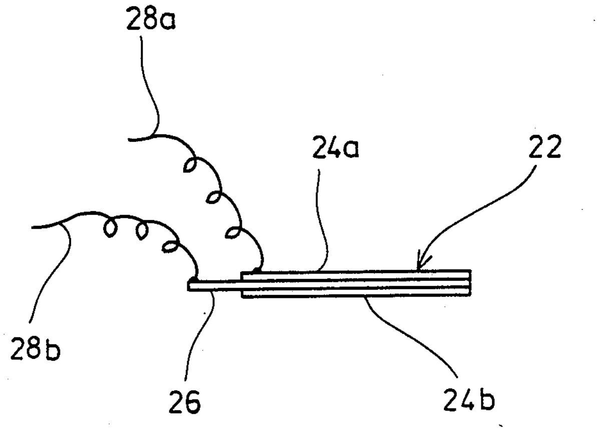
FIG. 2 is a side elevational view of the electrostrictive element.

The nozzle flapper mechanism 12 is composed of a nozzle 18 having a prescribed orifice diameter and communicating through a passage 17 with a nozzle back-pressure chamber 16 of the pilot valve assembly 14, and a flapper 22 in the form of a cantilevered plate having one end fastened by a screw 20 to the transducer unit body 10. As illustrated in FIG. 2, the flapper 22 comprises an electrostrictive element composed of two upper and lower piezoelectric ceramic members 24*a*, 24*b* having electrodes on upper and lower surfaces, respectively, thereof, and an intermediate electrode plate 26 sandwiched between the piezoelectric ceramic members 24*a*, 24*b*. The upper piezoelectric ceramic member 24*a* and the intermediate electrode plate 26 are connected to lead wires 28*a*, 28*b*, respectively, through which a voltage is applied to the flapper 22.

The pilot valve assembly 14 includes two upper and lower diaphragms 30, 32 disposed in tandem, and an exhaust valve 34 and an inner valve 36 which coact with the diaphragms 30, 32. The exhaust valve 34 is composed of a substantially cylindrical body formed on the lower end of a diaphragm disc 33 by which the diaphragms 30, 32 are joined to and spaced apart from each other. As described later on, a portion of the inner valve 36 is seatable on the cylindrical body of the exhaust valve 34. The inner valve 36 has a first valve body 35 and a second valve body 37 connected thereto.

The transducer unit body 10 has a supply port 38 defined in one side thereof and communicating with the nozzle back-pressure chamber 16 through mutually communicating passages 40*a*, 40*b*, 40*c*, 40*d*, and 40*e*. A fixed orifice 44 is disposed in the passage 40*d* located downstream of the supply port 38 for restricting the rate of flow of air supplied under pressure.

A supply pressure chamber 46 is defined between the upper diaphragm 30 and the lower diaphragm 32 which has an effective area slightly smaller than that of the upper diaphragm 30. The supply pressure chamber 46 is supplied directly with the air pressure from the supply port 38 through a passage 47 from the passage 40*b*. An atmospheric-pressure chamber 48 is defined beneath the lower diaphragm 32 and vented to atmosphere through a passage or exhaust port 50.

The transducer unit body 10 also as an output port 52 defined in a side thereof opposite to the supply port 38. When the nozzle back pressure in the chamber 16, the supplied pressure in the chamber 46, and the atmospheric pressure in the chamber 48 are balanced in equilibrium, the inner valve 36 closes an air intake hole 54 connecting the supply port 38 and the output port 52. At this time, the second valve body 37 of the inner valve 36 is seated on a valve seat or exhaust port 60 of the exhaust valve 34 to close an exhaust passage 58 leading to the atmospheric-pressure chamber 48. Therefore, the pilot valve assembly 14 is of the nonbleed type which does not discharge air under pressure equilibrium. The inner valve 36 is normally urged by a spring 74 in a direction to close the air feed hole 54.

Figure 3:
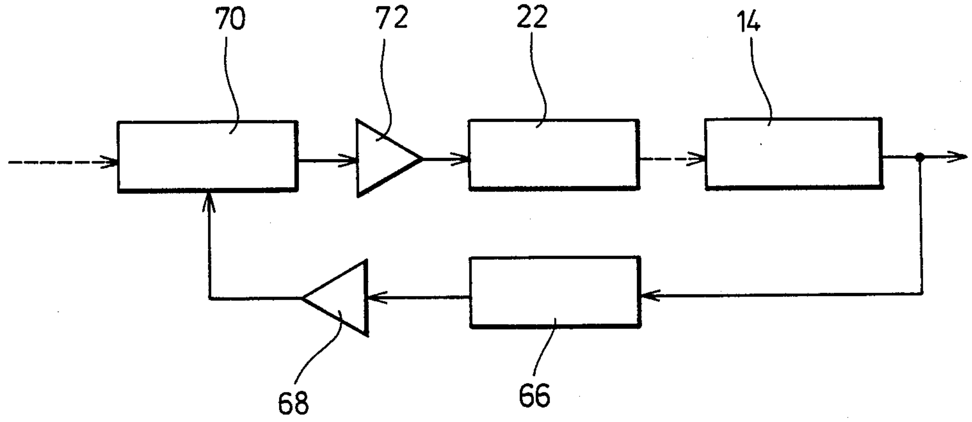
FIG. 3 is a block diagram of a feedback control system for the electropneumatic transducer.

An O-ring 64 is disposed in a passage 62 in which the cylindrical body of the exhaust valve 34 is slidably movable, for thereby preventing the output pressure in the output port 52 from being fed back to the lower diaphragm 32. The output pressure is converted by a pressure sensor 66 (FIG. 3) into an electric signal which is electrically fed back to a signal input end. More specifically, the pressure sensor 66, which may comprise a semiconductor diaphragm, is incorporated in the transducer unit body 10 as indicated by the dotted lines in FIG. 1, the pressure sensor 66 being connected to the output port 52 through a passageway 67. As illustrated in FIG. 3, the output pressure from the pilot valve assembly 14 is detected as an electric signal by the pressure sensor 66, and the electric signal is then fed back to a controller 70 via an amplifier 68. The controller 70 compares the signal from the amplifier 68 with an electric input signal applied to the electropneumatic transducer. The difference between the compared signals is then amplified by an amplifier 72, and the amplified signal is fed to the flapper 22.

Operation of the electropneumatic transducer thus constructed is as follows:

It is assumed that the pressures in the electropneumatic transducers are in a state of balance. At this time, the nozzle back pressure is applied to the upper surface of the upper diaphragm 30, while the supplied pressure is applied to the lower surface of the upper diaphragm 30. The supplied pressure is also imposed on the upper surface of the lower diaphragm 32, while the atmospheric pressure is imposed on the lower surface of the lower diaphragm 32. Under this equilibrium condition, the air intake hole 54 and the exhaust port 60 are closed by the inner valve 36. When the voltage applied to the flapper 22 composed of the electrostrictive element is increased, the free end of the flapper 22 is displaced in a direction to close the nozzle 18. Since the amount of air ejected from the nozzle 18 is reduced, the nozzle back pressure in the nozzle back-pressure chamber 16 goes higher and acts on the upper surface of the upper diaphragm 30 to lower the diaphragm disc 33. The pressures are now brought out of balance, and the downward movement of the upper and lower diaphragms 30, 32 lowers the exhaust valve 34 integral with the diaphragm disc 33 and the inner valve 36 moving therewith. The first valve body 35 of the inner valve 36 is unseated to open the air intake hole 54 to supply part of the pressure supplied from the supply port 38 as an output pressure into the output port 52. The output pressure which is commensurate with the increase in the voltage applied to the flapper 22 is then supplied to a load (not shown) to perform prescribed work on tHe load.

The passage 62 in which the exhaust valve 34 is slidably movable is sealed in an airtight manner by the O-ring 64, and the lower side of the lower diaphragm 32 is vented to atmosphere through the passage 50, as described above. Therefore, the output pressure is not fed back to the lower diaphragm 32, and hence the gain of the output pressure with respect to the nozzle back pressure is so large that the output pressure will vary widely even if the nozzle back pressure changes slightly.

Inasmuch as the output pressure is fed back by the pressure sensor 66 as an electric signal to the signal input end, the nozzle back pressure returns to the original level when the output pressure reaches a pressure indicated by the input signal. Then, the inner valve 36 returns under the bias of the spring 35 to close the air intake hole 54 and the exhaust port 60, whereupon the pressures are brought into a new state of balance.

Figure 4:
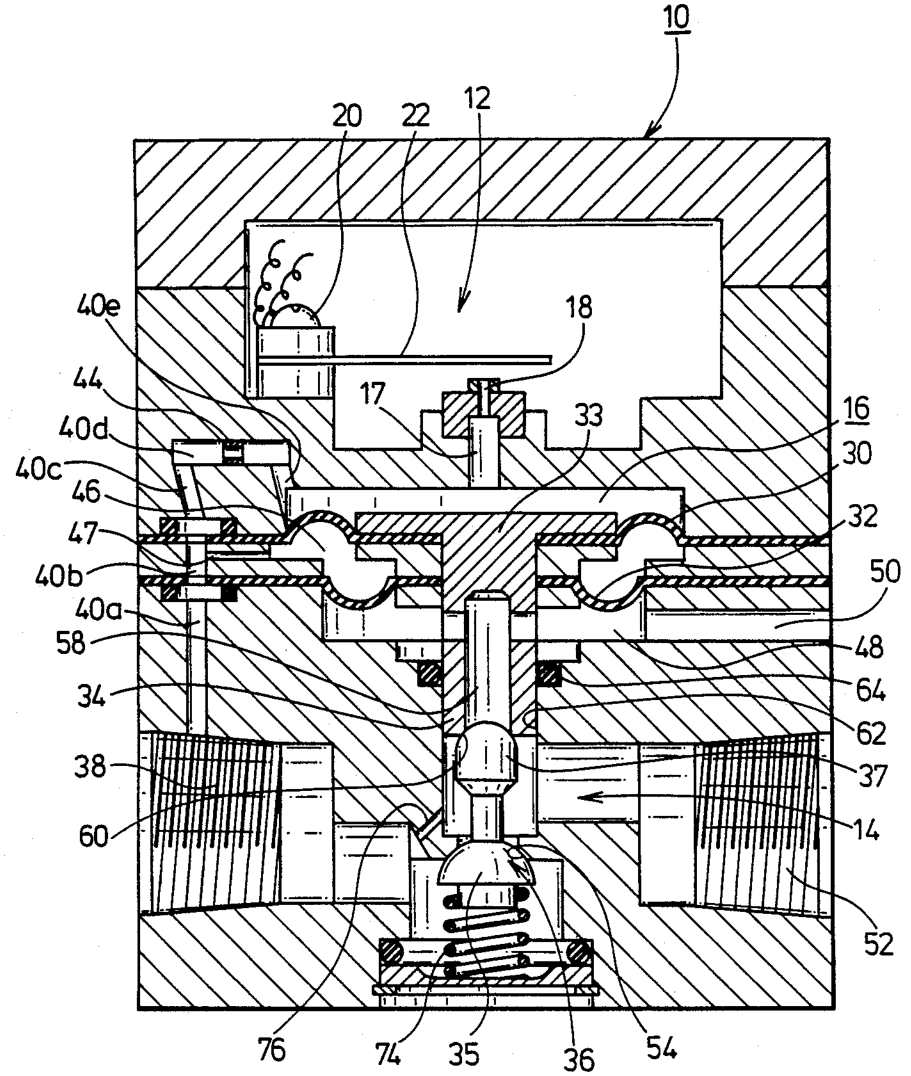
FIG. 4 is a vertical cross-sectional view of an electropneumatic transducer according to another embodiment of the present invention.

FIG. 4 shows an electropneumatic transducer according to another embodiment of the present invention. The transducer unit body 10 has a bypass passage 76 of a reduced diameter held in communication between the supply port 38 and the output port 52 in bypassing relation to the air feed hole 54. The bypass passage 76 allows a small amount of air under pressure to be supplied from the supply port 38 into the output port 52. Since the output pressure is gradually increased while under the pressure equilibrium condition, the increase in the output pressure is detected by the pressure sensor 66 which changes the voltage applied to the flapper 22. The nozzle back pressure is then varied to elevate the diaphragms 30, 32 and the exhaust valve 34. As a result, the second valve body 37 of the inner valve 36 is slightly opened in order to relieve the excessive output pressure, keeping the inner valve 36 under a floating condition. The inner valve 36 has now an increased sensitivity as it is capable of responding to a small change in the nozzle back pressure. If it were not for the bypass passage 76, the second valve body 37 when closed would be pressed against and bite into the valve seat 60 including a lining member made as of rubber (not shown), resulting in a lowered sensitivity.

Figure 5:
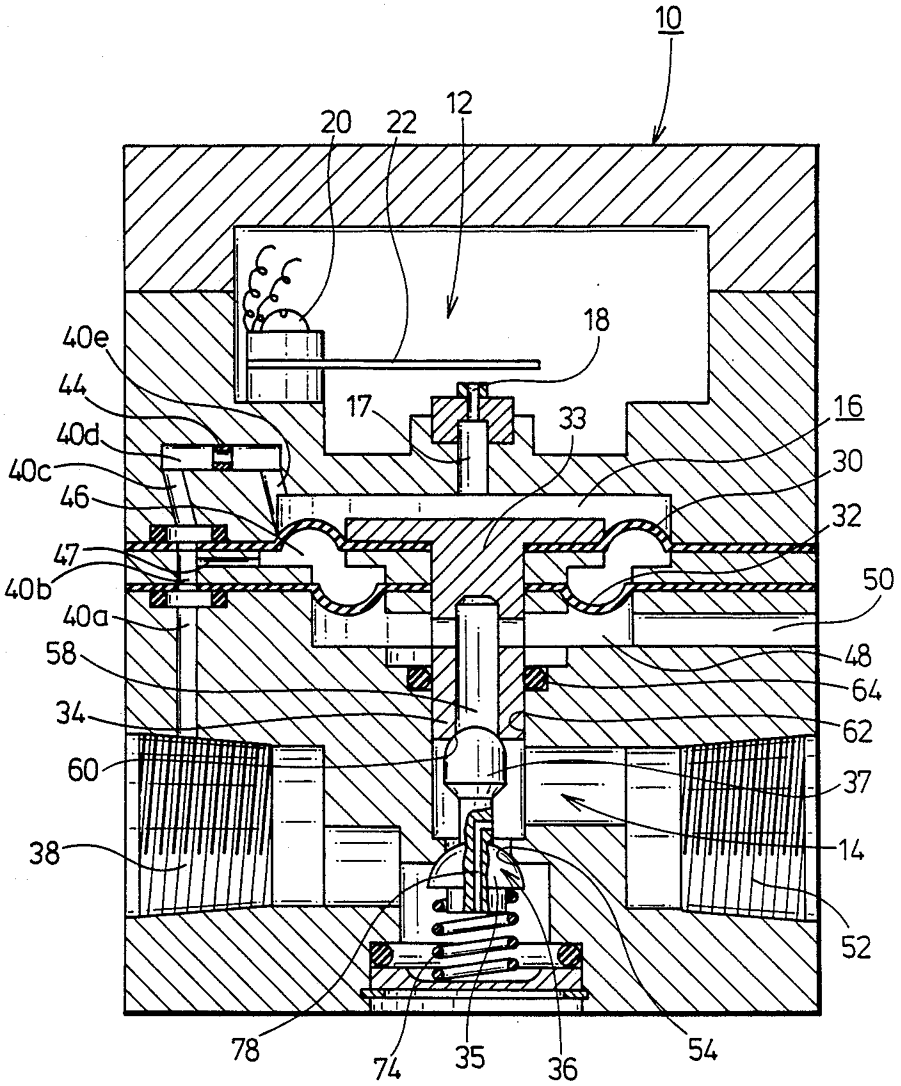
FIG. 5 is a vertical cross-sectional view of an electropneumatic transducer according to still another embodiment of the present invention.

According to still another embodiment shown in FIG. 5, the inner valve 36 has a bypass passage 78 defined therein to provide communication between the supply port 38 and the output port 52 in bypassing relation to the air intake hole 54 to serve the same purpose as that of the bypass passage 76 illustrated in FIG. 4. The bypass passage 78 extends axially in the inner valve 36 and has one end opening at the bottom of the first valve body 35 and the opposite end opening laterally into the output port 52. The inner valve 38 is kept under a floating condition at all times so as to be responsive sharply to variations in the nozzle back pressure.

Figure 6:
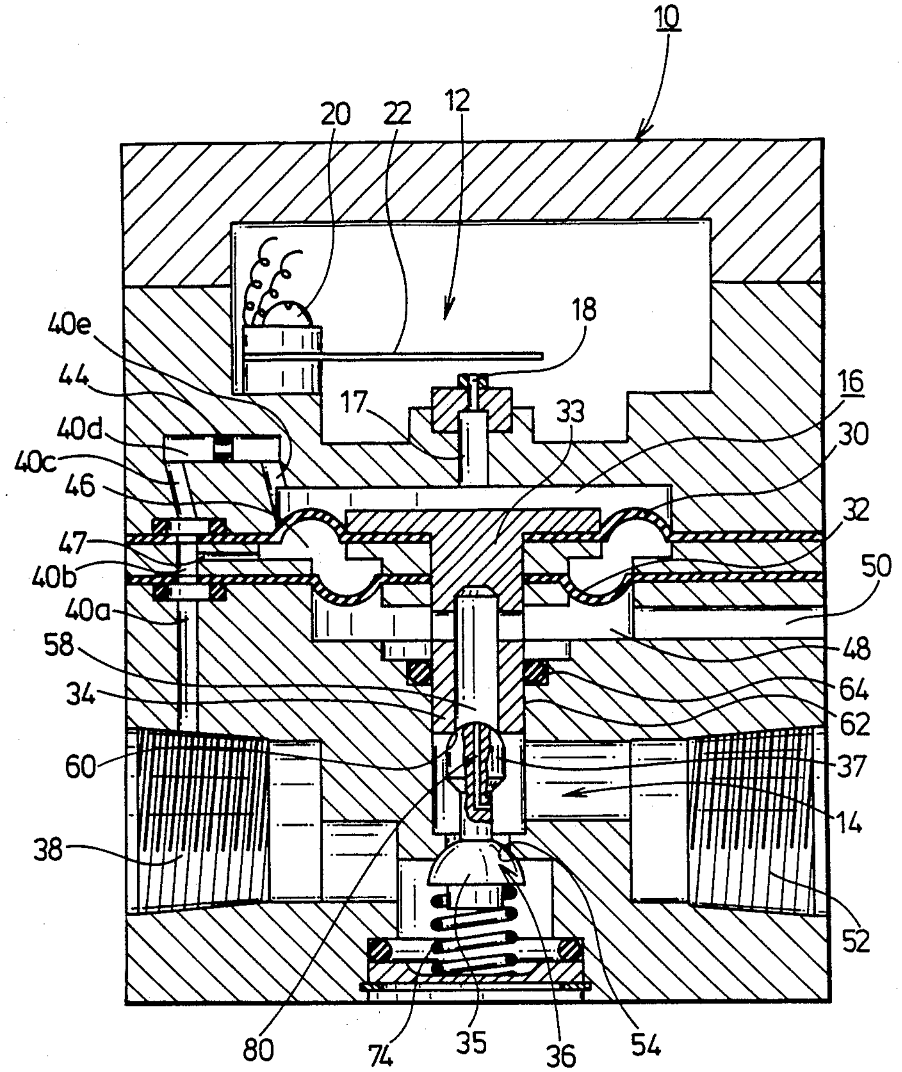
FIG. 6 is a vertical cross-sectional view of an electropneumatic transducer according to a still further embodiment of the present invention.

An electropneumatic transducer according to a still further embodiment of the present invention is illustrated in FIG. 6. A bypass passage 80 is defined in the inner valve 36 in communication between the exhaust port 60 and the output port 52. With this embodiment, in order to compensate for a gradual reduction of the output pressure when under equilibrium, the inner valve 36 is slightly opened to introduce the supplied pressure into the output port 52.

Where a lining member as of rubber is disposed on the first valve body 35, it would not be pressed against and bite into the edge around the air intake hole 54 since the inner valve 36 is maintained in a floating condition, thus providing a high valve sensitivity.

Figure 7:
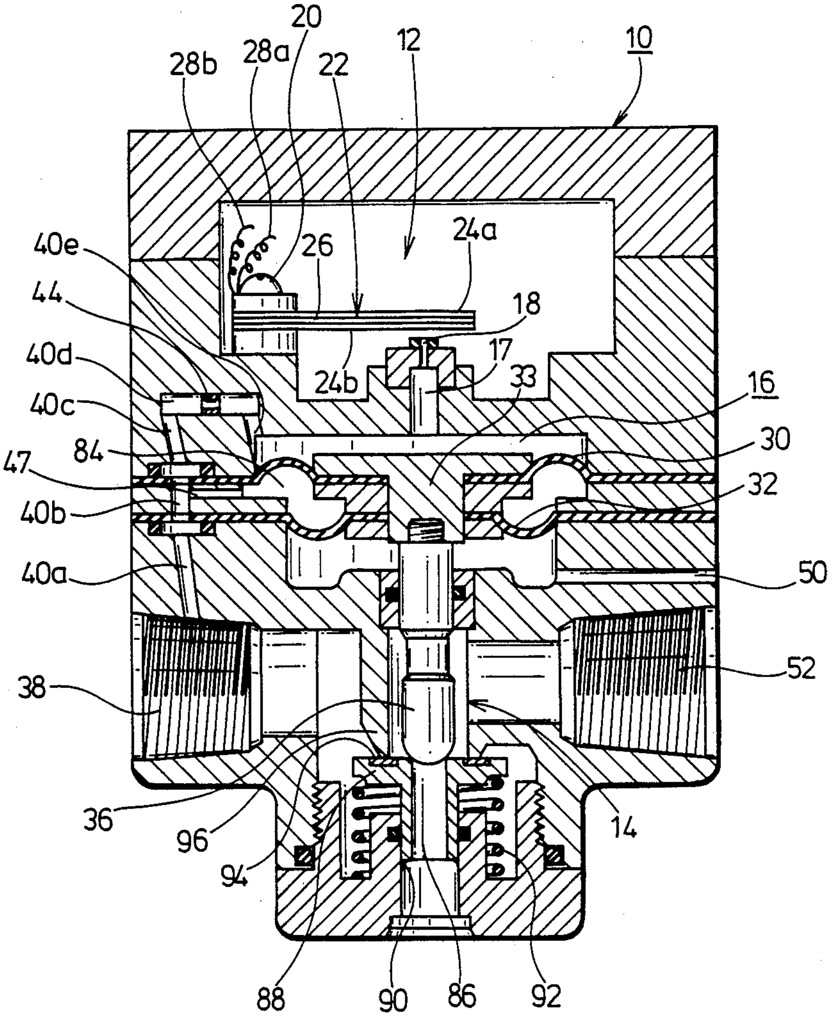
FIGS. 7 through 9 are vertical cross-sectional views of electropneumatic transducers according to other embodiments of the present invention.

FIG. 7 shows an electropneumatic transducer according to another embodiment. As shown in FIG. 7, an exhaust port 86 is defined below the inner valve 36, which is of an inverted disposition unlike the inner valves 36 of the previous embodiments. The inner valve 36 is mounted on the diaphragm disc 33 and engages the exhaust port 86. The exhaust port 86 is defined in an air intake valve 88 slidable in a bore 90 defined in the body 10 and normally urged to move upwardly under the force of a coil spring 92 so as to be seated on a valve seat 96 through a rubber packing 94.

When the pressure in the nozzle back-pressure chamber 16 is changed, the diaphragms 30, 32 are lowered to depress the inner valve 36 for thereby depressing the air intake valve 88 against the resiliency of the coil spring 92. At the time the rubber packing 94 is unseated off the valve seat 96 in the form of a sharp edge, the supply port 38 and the output port 52 are brought into communication with each other. The output pressure from the output port 52 is thus increased to perform desired work on a load with the increased output pressure commensurate with the increase in the applied voltage.

Figure 8:
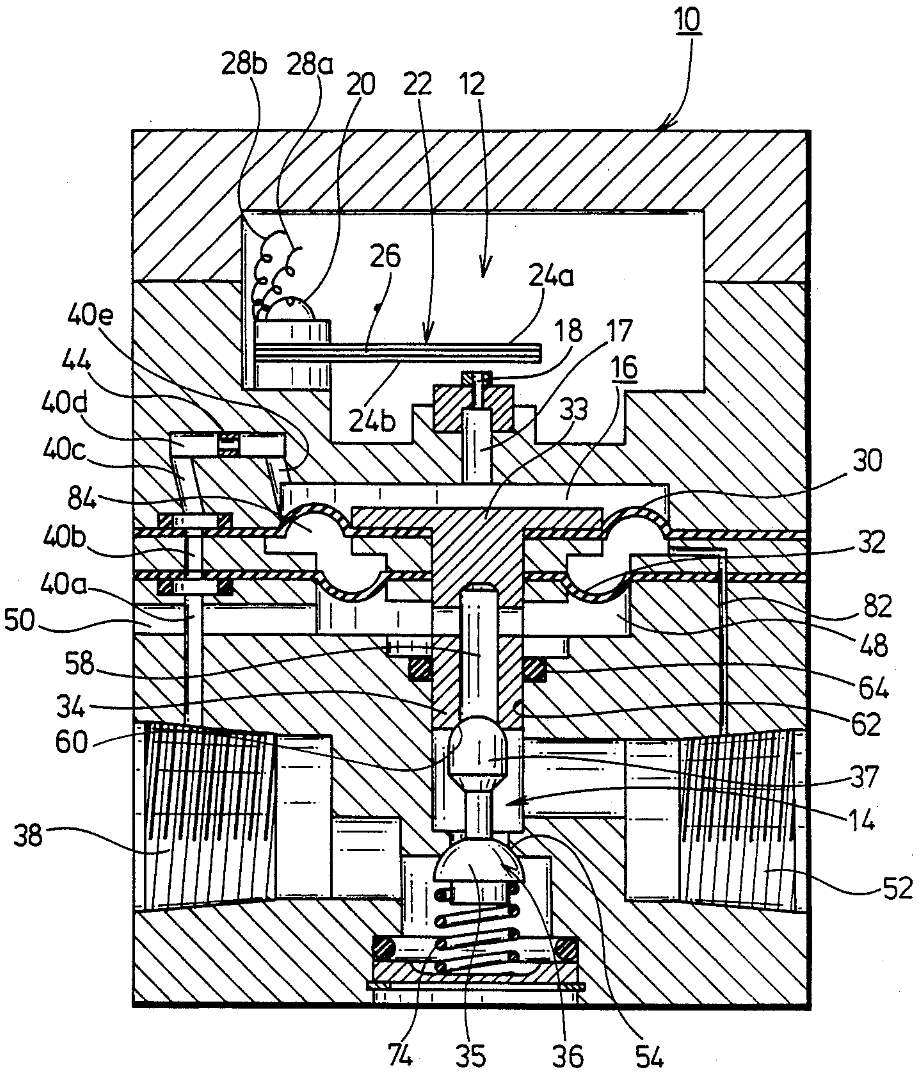

An electropneumatic transducer according to yet another embodiment is shown in FIG. 8. The electropneumatic transducer of FIG. 8 has no supply pressure chamber, but has an output pressure chamber 84 defined between the diaphragms 30, 32 and connected to the output port 52 through a passage 82 of a small diameter to introduce part of the output pressure via the passage 82 into the output pressure chamber 84. By selecting the difference between the effective areas of the diaphragms 30, 32 to be small, the gain of the output pressure with respect to the nozzle back pressure can be quite high to enable the output pressure to vary largely in response to a slight change in the nozzle back pressure.

More specifically, the output pressure gain with respect to the nozzle back pressure can be determined as follows: The following equations are established when the forces acting on the diaphragms disc 33 are balanced:

$$P_N A_N + P_O A_O = P_O A_N \quad (1)$$

$$P_N A_N = P_O (A_N - A_O) \quad (2)$$

-continued $$\frac{P_O}{P_N} = \frac{A_N}{A_N - A_O} \qquad (3)$$

where $P_N$ is the pressure acting on the diaphragm disc 33, i.e., the nozzle back pressure, $P_O$ is the output pressure, $A_N$ is the effective area of the diaphragm 30, and $A_O$ is the effective area of the diaphragm 32. In order to increase the pressure gain $P_O/P_N$, the difference between the effective areas $A_N$, $A_O$ should be reduced. For example, if $A_N=5$ and $A_O=4$, then $$\frac{P_O}{P_N} = \frac{5}{5-4} = 5$$

Accordingly, the gain of the output pressure with respect to the nozzle back pressure is 5.

Figure 9:
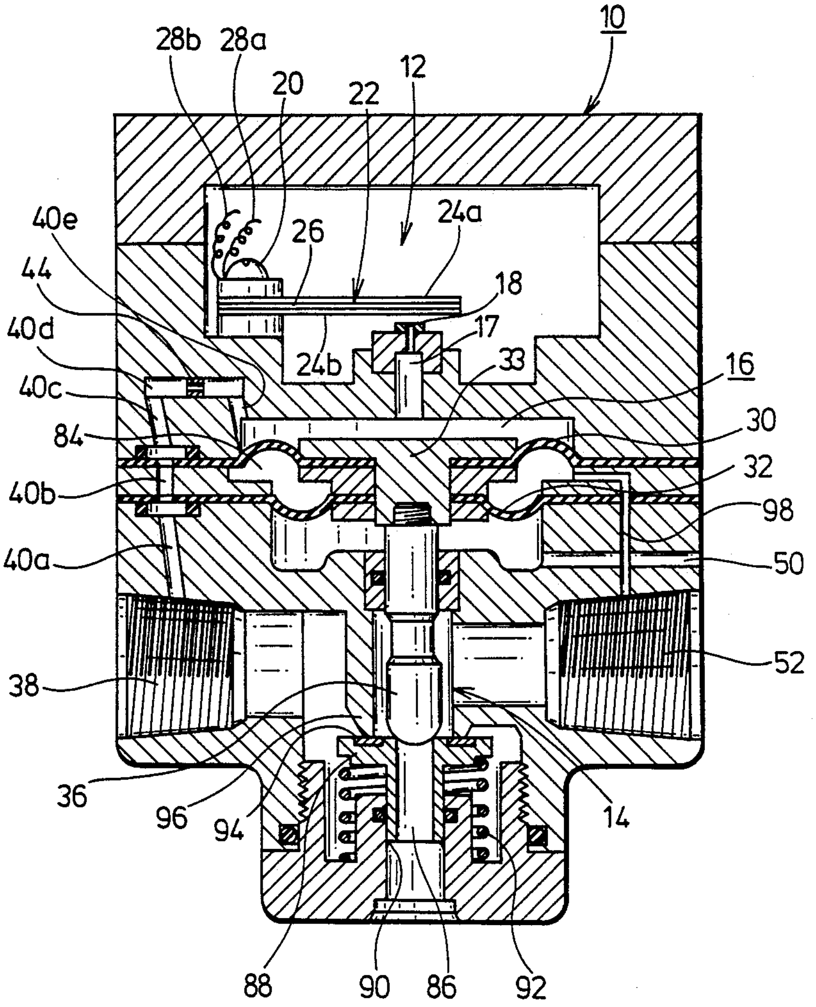

FIG. 9 illustrates still another embodiment according to the present invention. The electro-pneumatic transducer of FIG. 9 is similar to that of FIG. 8 except that it has an air intake valve 88 identical to the air intake valve 88 shown in FIG. 7. The output pressure chamber 84 defined between the diaphragms 30, 32 is held in communication with the output port 52 through a passage 98.

In operation, when the pressure in the nozzle back-pressure chamber 16 is changed, the diaphragms 30, 32 are lowered to depress the inner valve 36 for thereby depressing the air intake valve 88 against the resiliency of the coil spring 92. At the time the rubber packing 94 is unseated off the valve seat 96 in the form of a sharp edge, the supply port 38 and the output port 52 are brought into communication with each other. The variation thus produced in the output pressure in the output port 52 is introduced through the passage 98 into the output pressure chamber 84 to raise the diaphragm disc 33. Therefore, the inner valve 36 is also lifted to allow the output pressure to bleed through the exhaust port 86.

While in each of the foregoing embodiments the nozzle flapper mechanism 12 and the pilot valve assembly 14 are incorporated together in the single transducer unit body 10, they may be accommodated in separate housings.

With the arrangement of the present invention, since the nozzle flapper is constructed of an electrostrictive element, the transducer unit is highly resistant to vibrations and impacts, and is small in size and lightweight. Inasmuch as the output pressure is not fed back as a pneumatic pressure to the diaphragms of the pilot valve assembly, the output pressure can be varied widely in response to a slight displacement of the electrostrictive element. Therefore, the transducer unit consumes a small amount of electric energy and is highly accurate in operation due to reduced hysteresis and nonlinearity of the electrostrictive element. The electrostrictive element is also highly durable as it is subjected to small displacements. Further, because the pilot valve assembly is of the nonbleed type, it consumes a small amount of air even when used under high pneumatic pressure.

The electropneumatic transducer of the present invention may be used as a pilot relay preferably in the form of an electropneumatic positioner for controlling the displacement of a control valve.

Although certain preferred embodiments have been shown and described, it should be understood that many changes and modifications may be made therein without departing from the scope of the appended claims.

What is claimed is:

1. An electropneumatic transducer comprising:

(a) a body having supply and output ports;

(b) a nozzle flapper mechanism disposed in said body for varying a nozzle back pressure in response to the displacement of a nozzle flapper thereof;

(c) an inner valve disposed in a passage connecting said supply port and said output port for opening and closing said passage under the action of a diaphragm assembly operative in response to said nozzle back pressure;

(d) said nozzle flapper comprising an electrostrictive element displaceable dependent on a change in an electric signal applied thereto;

(e) said inner valve comprising a nonbleed-type pilot valve;

(f) said diaphragm assembly comprising two flexible diaphragms centrally coupled together by a joining member held in engagement with said inner valve, said nozzle flapper mechanism including a nozzle having a communication hole opening toward one of said diaphragms, the other diaphragm facing into an atmospheric-pressure chamber defined in said body and vented to atmosphere, wherein said two diaphragms define a chamber therebetween held in communication with said supply port through a passage defined in said body so that a supply pressure is supplied from said supply port into said chamber, said one diaphragm having one surface subjected to the nozzle back pressure, said other diaphragm having one pressure subjected to the atmospheric pressure in said atmospheric-pressure chamber.

2. An electropneumatic transducer according to claim 1, wherein said electrostrictive element is of the bimorph type comprising a cantilevered rectangular plate having one end fixed to said body and an opposite free end.

3. An electropneumatic transducer according to claim 1 wherein said joining member comprises an exhaust valve openable and closable by an end of said inner valve engageable therewith.

* * * * *